INVENTOR
VINCENT J. CUSHING

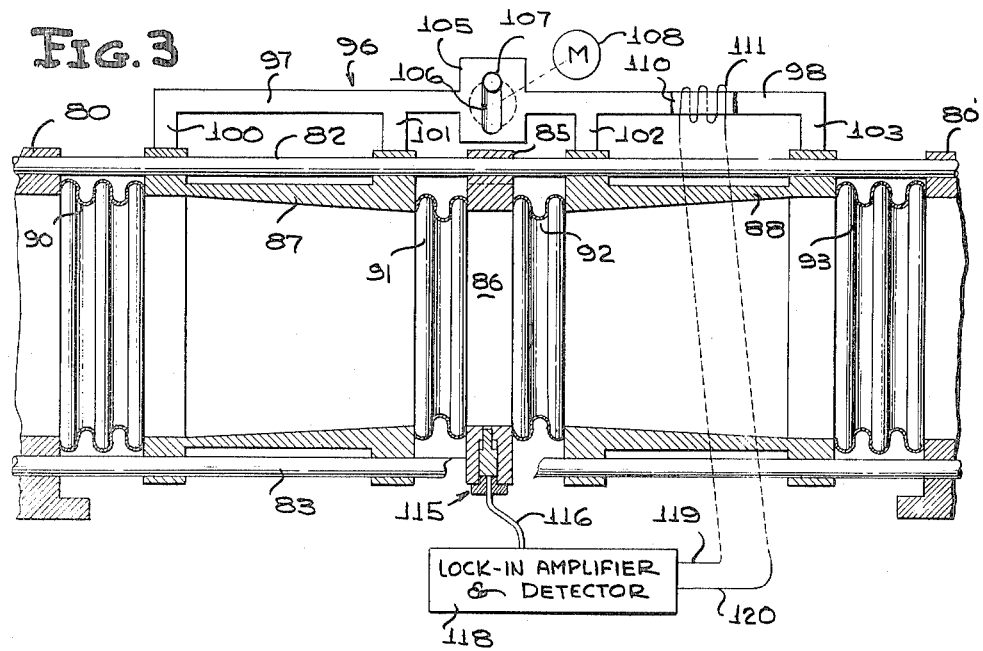

May 17, 1966  V. J. CUSHING  3,251,226
APPARATUS FOR MEASURING MASS FLOW AND DENSITY
Filed March 12, 1963  3 Sheets-Sheet 3
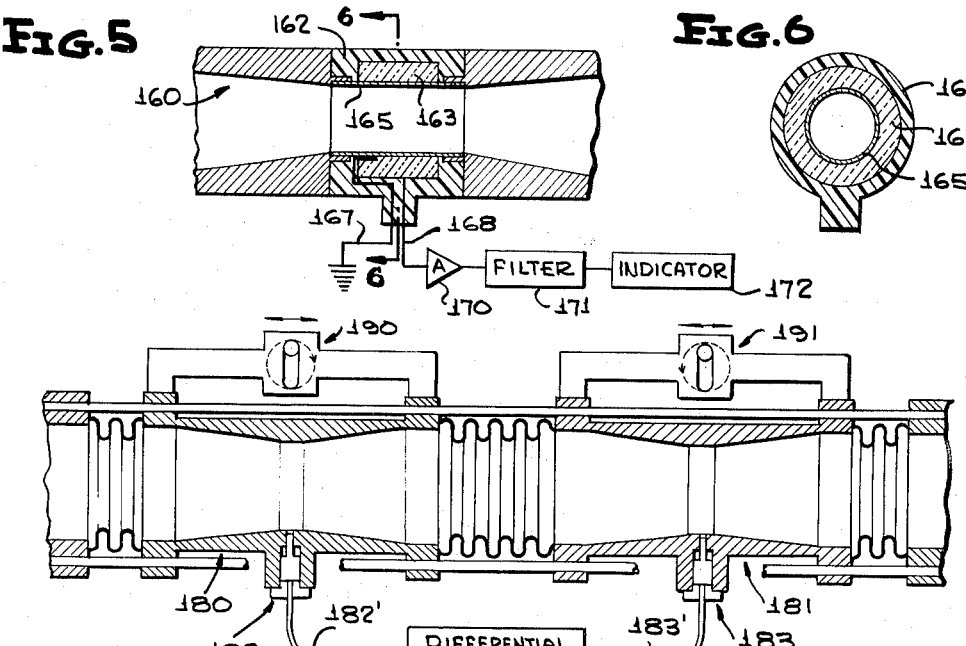
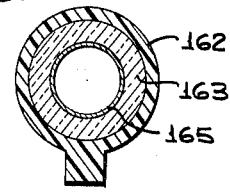
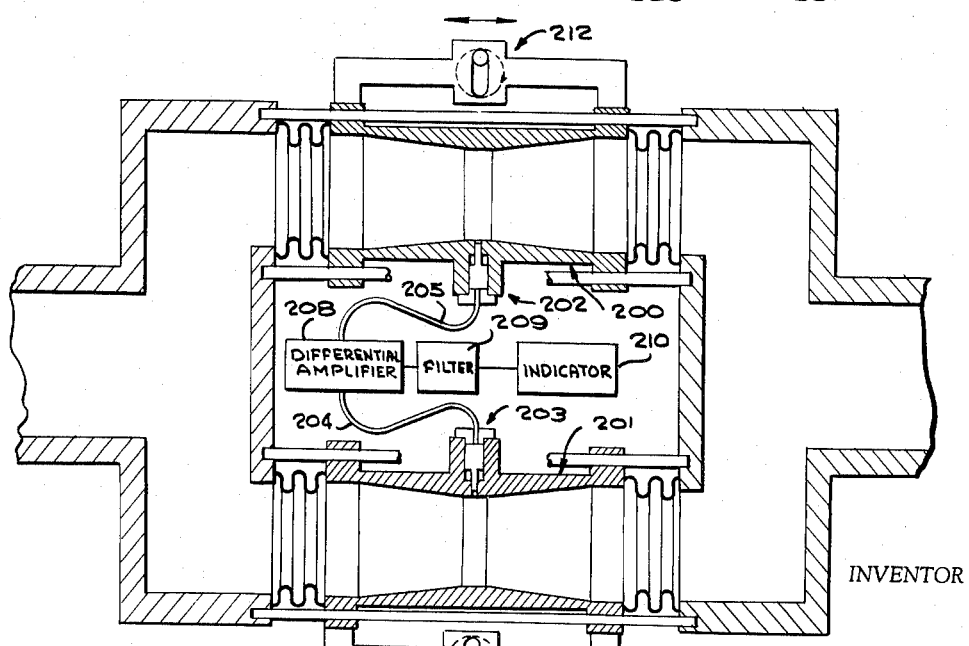
INVENTOR
VINCENT J. CUSHING
BY
ATTORNEYS

3,251,226
APPARATUS FOR MEASURING MASS FLOW AND DENSITY
Vincent J. Cushing, 9804 Hillridge Drive, Kensington, Md.
Filed Mar. 12, 1963, Ser. No. 264,604
14 Claims. (Cl. 73—205)

The present invention relates to new and novel apparatus for measuring a mass transport property of a moving fluid, and more particularly to measuring the density and mass flow of a moving fluid employing an arrangement which establishes axial acceleration in the fluid to be measured.

It has been a long-standing problem in the art to provide a simple and effective means for accurately measuring the mass flow and density of fluids, and the requirement for such apparatus has increased sharply in the recent past with the advent of high-powered engines and propulsion systems wherein horse power and/or thrust are measured and controlled in terms of propellant mass flow. There are, of course, many applications wherein it is essential to accurately measure the amount of fluid flow as in pipe lines and the like.

Flow meters now in use and known in the prior art, and which fundamentally respond to mass-flow rate generally make use of some sort of induced acceleration in the flow. Radial flow types of existing flow meters make use of Coriolis acceleration, while axial flow types make use of torsional acceleration. On the other hand, gyroscopic types of flow meters now in use make use of angular acceleration. The radial and gyroscopic flow types now in use are quite bulky and require considerable disturbance to the flowing fluid which is, of course, very undesirable. The axial flow type of flow meter causes a very definite internal obstruction to the flow and further requires the use of rotating parts. The novel apparatus of the present invention utilizes a completely new concept in this field wherein an axial acceleration is established in the flowing fluid without requiring the fluid to change direction, the arrangement of the present invention superimposing a sinusoidal axial flow oscillation on the otherwise steady flow as it passes through a measuring portion of the apparatus. This sinusoidal oscillation in the flow couples with the steady flow of the fluid in such a manner so as to produce an alternating pressure which is proportional to the steady mass flow rate, and means is provided for measuring this alternating pressure and indicating the rate of mass flow as a function of the changing pressure.

The basic concept upon which the invention is based is developed in the theoretical discussion set forth hereinbelow.

As a first approach to the concept let us consider incompressible quasi-steady flow in one dimension. Bernoulli's equation for such flow has the well known form $$P - P_1 = (\rho/2)(U_1^2 - U^2) \quad (1)$$

where P is the pressure where the flow velocity is U;
$P_1$ is the pressure in the fluid where the flow velocity is $U_1$; $\rho$ is the fluid density.

Now, if $U_1$ is the flow velocity due to the steady flow U with a superposed oscillatory flow $u$, we have $$U_1 = U - u \cos \omega t \quad (2)$$

where $\omega$ is the angular frequency of the superposed flow oscillation. Substitution of Eq. 2 into Eq. 1 yields $$P_1 - P = (\rho/2)(2uU \cos \omega t - u^2 \cos^2 \omega t) \quad (3a)$$

or $$P_1 = p_0 + p_1 \cos \omega t + p_2 \cos 2\omega t \quad (3b)$$

where $$p_0 = P - \rho u^2/4 \quad (4a)$$
$$p_1 = \rho U u \quad (4b)$$
$$p_2 = \rho u^2/4 \quad (4c)$$

Clearly, then, $p_0$ is the steady component of the measured pressure $p_1$; $p_1$ is the fundamental (i.e., at angular frequency $\omega$) component of the measured pressure; $p_2$ is the second harmonic of the measured pressure.

Now, the pass flow $F_m$ is defined by:

$$F_m = \rho U A \quad (5)$$

where A is the cross-sectional area of the flow system. Thus, if we measure the pressure perturbation due to the superposed sinusoidal flow perturbation, we find that the mass-flow can be determined by tuning our pressure detection system to the fundamental frequency $\omega$; the flow signal $p_1$ at this frequency is $$p_1 = F_m u/A \quad (6)$$

where $F_m$ is the mass flow;

$u$ is the fixed amplitude of the superposed sinusoidal flow oscillation in the region where the pressure measurement $p_1$ is made;

A is the fixed cross-sectional area of the flow system in the region where the steady flow velocity U exists.

The above analysis is directed to an arrangment wherein the system provides an indication of the mass flow of the fluid. On the other hand, it is also possible to readily modify the system so as to provide an indication of the density of the fluid.

From an inspection of Eq. 3b and Eq. 4c, it is apparent that by tuning the pressure detection system to $2\omega$, the second harmonic of the fundamental frequency, an indication can be obtained of the density of the fluid.

It is apparent from the foregoing that the present invention is directed to an arrangement for measuring either density or mass flow of a moving fluid. Both density and mass flow may be designated as mass transport properties of a moving fluid, and accordingly, this terminology is used throughout the specification and claims to indicate generically both the density and the mass flow of the moving fluid. It should be understood that the present invention may be employed for measuring either of the two mass transport properties discussed above, independently of one another, or if desired, these two mass transport properties may be measured simultaneously.

In the present invention, the flowing fluid is passed through a measuring zone provided at a suitable portion of a fluid conduit means, the fluid to be measured passing through this measuring zone or portion at a substantially steady flow rate. The means for establishing an independent, known axial sinusoidal oscillation on the fluid passing through the measuring zone may take a number of different forms, and several different configurations have been illustrated for carrying out this function. It will be understood that many other possible alternative means of developing these oscillations will occur to one skilled in the art, and the examples shown are for the purpose of illustration only.

As mentioned previously, the axial oscillation superimposed on the flow couples with the steady flow to produce an alternating pressure. Suitable means is provided for measuring this pressure within one or more points in the measuring portion of the fluid conduit means, and the measuring means preferably generates an electrical signal proportional to the pressure changes sensed by the measuring device.

The output of the pressure measuring apparatus is connected with suitable detector indicating means, the indicating means taking any conventional form for indicating mass flow. The purpose of the detector means is primarily to remove undesired signals and to pass only those signals which are indicative of the pressure changes occurring in the measuring zone due to the superimposed sinusoidal oscillations. For this purpose, a relatively conventional filter means may be employed which is tuned either to the fundamental frequency or the second harmonic of the fundamental frequency of the means generating the sinusoidal oscillations depending on whether it is desired to measure the mass flow or the density respectively, the filter means serving to pass signals at these frequencies and to filter out different signals at other frequencies.

In addition, phase-sensitive means may be employed in the detector mechanism to assure that only those signals will be passed to the indicator which are in phase with the oscillations of the means producing the sinusoidal oscillations thereby providing a relatively fool-proof means of preventing any spurious signals from reaching the indicator mechanism.

The present invention is particularly designed to provide excellent linearity over a very wide dynamic range, and a minimum pressure drop and substantially obstructionless configuration is provided. The arrangement further provides a rapid response time and is quite simple, inexpensive and compact in construction, and yet efficient and reliable in operation. The present invention may be carried out in many different ways with widely varying configurations utilizing readily available components of an inexpensive nature.

An object of the present invention is to provide new and novel apparatus for measuring mass flow which has excellent linearity over a wide dynamic range.

Another object of the invention is the provision of apparatus for measuring mass flow which provides a minimum pressure drop and which employs a substantially obstructionless physical configuration.

A further object of the invention is to provide apparatus for measuring mass flow which has rapid response time, which is simple, inexpensive and compact in construction; and yet which is quite efficient and reliable in operation.

Other objects and many attendant advantages of the invention will become more apparent when considered in connection with the specification and accompanying drawings, wherein:

FIG. 3 is a view similar to FIG. 1 illustrating a still further modified form of the apparatus;

FIG. 4 is a view similar to FIG. 1 illustrating still another modification of the present invention;

FIG. 5 is a longitudinal section through a modified form of pressure sensing means;

FIG. 6 is a cross-sectional view taken substantially along line 6—6 of FIG. 5 looking in the direction of the arrows;

FIG. 7 illustrates a further modified form of the invention wherein a plurality of devices for measuring mass flow are connected in series with one another; and FIG. 8 illustrates a further modified form of the invention wherein a plurality of devices for measuring mass flow are connected in parallel with one another.

Figure 1:
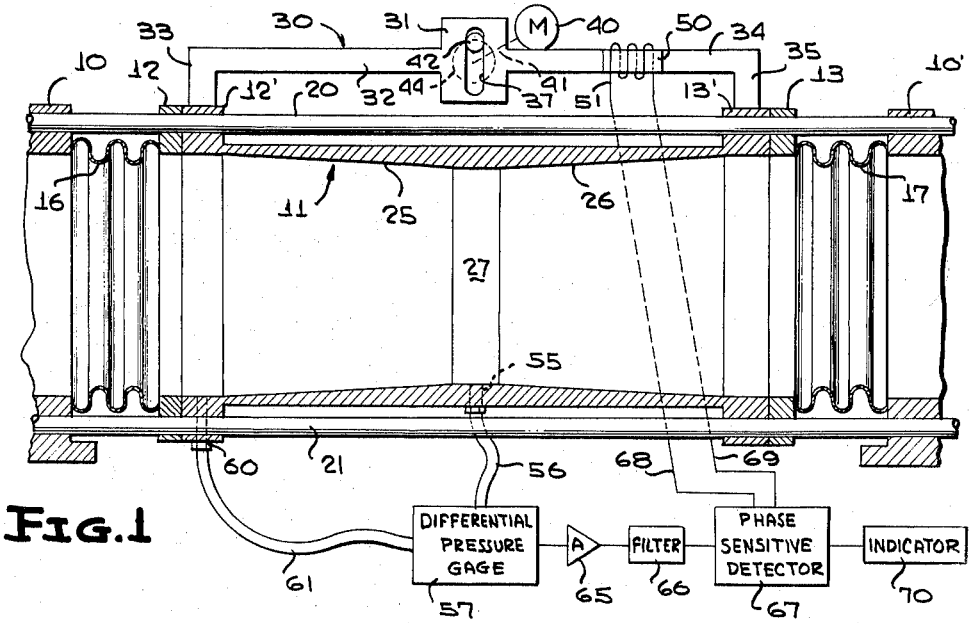
FIG. 1 is a longitudinal section through one form of the apparatus illustrating rather schematically the electrical network associated with the physical structure for carrying out the invention.
Figure 2:
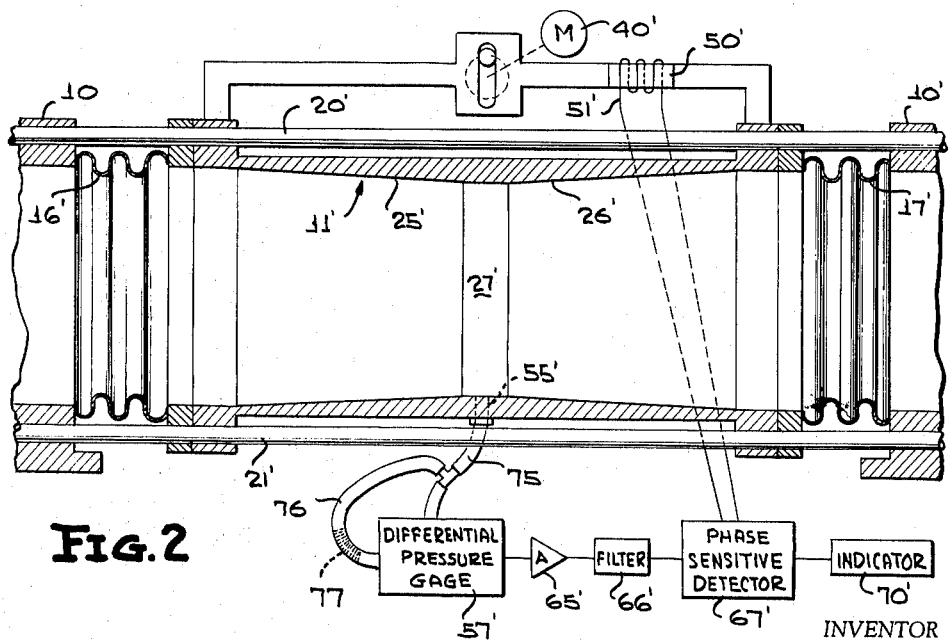
FIG. 2 is a view similar to FIG. 1 illustrating a modified form of the apparatus.

In the first three modifications illustrated in the drawings as seen in FIGS. 1, 2 and 3, the means for producing the desired flow perturbations on the fluid flow takes the familiar configuration of a Venturi which has one or more portions thereof connected so as to oscillate to and fro along its axis of symmetry. In applying the foregoing technical discussion to this type of physical configuration, we shall assume that there is one-dimensional quasi-steady flow. The one-dimensional assumption implies that all fluid-dynamic variables are functions of only one space coordinate, and in this case, the coordinate would be measured along the axis of the fluid conduit means and the Venturi.

The quasi-steady flow assumption implies that the equations derived for steady flow conditions can be used to represent conditions in the flowmeter. To determine the condition under which a quasi-steady analysis is valid we note the following. If $c$ is the velocity of sound in the metered fluid and $\omega$ is the angular frequency of the oscillating Venturi, the wavelength of this disturbance is $\lambda = 2\pi c/\omega$. If the length of the fluid element we are investigating, i.e., the length of the flowmeter, is very small compared with the wavelength, then the time derivatives of the fluid-dynamic variables can be neglected. For example, $c$ in water is about 5000 ft./sec., so if the frequency of the oscillation of the Venturi were 60 c.p.s., the wave length would be about 83 feet, and the quasi-steady flow assumption would be valid if the flowmeter length were on the order of one foot, as expected.

A second consideration bearing on the frequency of oscillation, is that the axial acceleration flowmeter can resolve variations in flow and density which take place at a rate slow compared with the frequency of oscillation.

For such quasi-steady flow conditions we have from the equation of continuity $$F_m = \rho U A \tag{7}$$

where $F_m$ is the mass-flow rate;

U is the average (throughout any cross section of the flow pipe) velocity of the metered fluid;

$\rho$ is the density of the metered fluid;

A is the cross sectional area of the flow pipe. We emphasize that U is the fluid velocity relative to the fixed plumbing system (i.e., to a fixed reference frame).

If $U_t$ is the fluid velocity (averaged across the throat area) in the Venturi's throat—and again we emphasize velocity relative to the fixed plumbing system—then the quasi-steady equation of continuity in the frame of reference moving with the Venturi throat yields $$(U - u \cos \omega t) A = (U_t - u \cos \omega t)\rho A_t \tag{8}$$

where $u \cos \omega t$ is the velocity of the Venturi throat relative to the fixed plumbing system;

$A_t$ is the cross-sectional area of the Venturi throat.

From Eq. 8 we find that the fluid velocity in the throat, $U_t$, is $$U_t = AU/A_t - ([A/A_t] - 1)\, u \cos \omega t \tag{9}$$

Next, since we are assuming quasi-steady flow, we can use Bernoulli's equation:

$$P_t - P = \frac{\rho}{2}(U^2 - U_t^2) \tag{10}$$

where $P_t$ is the fluid pressure in the Venturi throat;

P is the pressure of the metered fluid (i.e., an ambient pressure undisturbed by the oscillating Venturi);

$\rho$ is the fluid density (which is allowed to vary quasi-steadily) of the metered fluid;

U is the flow velocity of the metered fluid;

$U_t$ is the flow velocity in the Venturi throat.

Of the variables in Eq. 10, $P_t$ and $U_t$ may be expected to have a steady component plus alternating components; the remainder are steady in time.

If we now substitute Eq. 9 into Eq. 10, we can set up three equations: the first is established by equating the steady terms; the second equation is established by equating those terms which vary as $\cos \omega t$; and the third equation is established by equating those terms which vary as $\cos 2\omega t$. We observe that the throat pressure, $P_t$, must have corresponding frequency components, i.e., $$P_t = P_{to} + p_1 \cos \omega t + P_2 \cos 2\omega t \qquad (11)$$

Consequently, making use of Eq. 11, the three equations are:

The Steady Component:

$$P_{to} = P - (\rho/2)([A/A_t]^2 - 1)U^2 \\ - (\rho/4)([A/A_t] - 1)^2 u^2 \qquad (12a)$$

The Fundamental Component:

$$p_1 = \rho U A (u/A_t)([A/A_t] - 1) \qquad (12b)$$

The Second Harmonic Component:

$$p_2 = -(\rho u^2/4)([A/A_t] - 1)^2 \qquad (12c)$$

We now tune our pressure sensing system in the throat to the fundamental frequency, i.e., we selectively detect the alternating pressure $p_1$.

If we substitute Eq. 7 into Eq. 12b, we find as the expression for the alternating pressure $$p_1 - (u/A_t)([A/A_t] - 1)F_m \qquad (13)$$

where $u$ is the alternating velocity of the Venturi;

$A_t$ is the cross sectional area of the Venturi throat;

$A$ is the cross sectional area of the flow pipe;

$F_m$ is the mass flow rate in the flow pipe.

If we express the cross sectional areas in Eq. 13 in terms of pipe diameter, D, and Venturi throat diameter, $D_t$; and if the alternating motion of the Venturi is simple harmonic with (full) stroke, S, and angular frequency, $2\pi f$, we have $$p_1 = (4Sf/D_t^2)([D/D_t]^2 - 1)F_m \qquad (14)$$

Referring now particularly to FIG. 1 of the drawings, two spaced portions of a fluid conduit means or flow pipe are indicated generally by reference numerals 10 and 10', it being understood that fluid will flow through this fluid conduit means during operation of the apparatus at a substantially steady flow rate. An intermediate measuring portion of the fluid conduit means is indicated generally by reference numeral 11, and includes opposite end plates 12 and 13 which are connected with the adjacent end portions of the fluid conduit means by means of flexible bellows 16 and 17 respectively which enable the intermediate measuring portion to freely oscillate during operation of the apparatus while at the same time ensuring that an effective fluidtight seal is maintained.

A pair of guide rods 20 and 21 have the opposite ends thereof supported within the walls of the conduit portions 10 and 10', the measuring portion 11 including outwardly projecting flange portions 12' and 13' to which the plates 12 and 13 are secured respectively, members 12, 12', 13 and 13' all having aligned openings formed therethrough for receiving the guide rods 20 and 21 such that the intermediate measuring portion of the apparatus will be guided for axial oscillation.

It will be noted that the inner surface of the measuring portion 11 defines a Venturi tube, the two inner surfaces 25 and 26 tapering inwardly from the outer ends of the measuring portion and joining with a Venturi throat portion 27 at the central part of the measuring portion.

The actuating means for producing the desired oscillatory movement of the measuring portion 11 is indicated generally by reference numeral 30 and includes a central portion 31 from one side of which extends an arm 32 which in turn is connected with an arm 33 connected with the portion 12' of the measuring portion. An arm 34 extends from the opposite side of the central portion 31 of the actuating means and joins with an arm 35 which in turn is connected with the portion 13' of the measuring portion. Suitable means is provided for providing a sinusoidal axial oscillation of means 30 which in turn will cause a corresponding oscillatory movement of the measuring portion 11. This means takes the form of a slot 37 extending vertically as seen in FIG. 1 in portion 31. An electric motor indicated schematically by reference numeral 40 is indicated as having an output shaft schematically indicated by line 41 which in turn has an eccentric member 42 connected thereto. Member 42 is slidably mounted within slot 37 of the actuating means 30. As the motor 40 is driven at a substantially constant speed during operation of the apparatus, eccentric portion 42 will travel in a circular orbit as indicated by dotted line 44, member 42 sliding up and down within the slot 37 thereby generating a sinusoidal oscillation of the actuating means 30 and the attached measuring portion 11.

It will be understood that various means may be employed for obtainind the desired reciprocatory movement of the measuring portion, and the provision of an electric motor 40 and the illustrated attachment to the actuating means 30 is a most simple and and effective means for obtaining the desired movement.

It is anticipated that motor 40 will generally be operated off of conventionally available 60-cycle electrical energy such that the measuring portion 11 may oscillate at a fundamental frequency of 60 cycles per second. In such a case, the line voltage may be utilized for obtaining a reference signal for operating the phase-sensitive detector hereinafter described.

It should be understood that the actuating means 30 can be reciprocated at any desired frequency and in this case suitable means is provided for providing a reference voltage, this means being illustrated in FIG. 1 as comprising a permanent magnet 50 which may be embedded or supported within arm portion 34, a fixed coil 51 being disposed in surrounding relationship to the permanent magnet such that upon reciprocation of the actuating means 30, the permanent magnet will generate an electrical voltage in coil 51 which in turn may be utilized as a reference signal for actuating the phase-sensitive detector means hereinafter described.

A first presure tap 55 is threaded into a suitable opening in the measuring portion 11 and is in communication with the central portion of the Venturi throat 27. Tap 55 is connected through a suitable flexible tube 56 to a differential pressure gauge 57. A second pressure tap 60 is also threaded into a suitable opening in the measuring portion 11, and is in communication with the fluid conduit means immediately to one side of the Venturi tube section. It should be understood further that the fluid may flow through the fluid conduit means in either direction and the apparatus will operate equally as well. Pressure tap 60 is connected by means of a flexible tube 61 with the differential pressure gauge 57.

The differential pressure gauge 57 may be of any conventional construction, and may for example comprise a differential diaphragm type transducer such as manufactured by Dynisco, Division of American Brake Shoe Company, Cambridge, Mass., and identified as Model PT 69. The two tubes 56 and 61 communicate with opposite sides of the diaphragm of the gauge and an output electrical signal is provided proportional to the differences in the pressures operating on opposite sides of the diaphragm.

The signal output from the gauge 57 is fed into a conventional amplifier 65, the output of which is connected with a filter 66. This filter may be tuned to the fundamental frequency of the actuating means 30 so as to pass substantially only those pressure signals occurring as a result of the superimposed sinusoidal oscillations on the fluid flow. For example, filter 66 may comprise a relatively narrow band pass filter means having a center frequency the same as that of the fundamental frequency of the actuating means 30.

The output of the filter means 66 is in turn connected with a phase-sensitive detector mechanism 67. This phase-sensitive detector mechanism is connected by means of leads 68 and 69 with the coil 51 previously described such that the mechanism 67 receives a reference signal from the actuating mechanism 30. The phase-sensitive detector and indicator 70 may be combined in the form of a conventional wattmeter. Generally, this type of instrument is designed to indicate the product of electrical current and voltage taking into account phase angle. However, such instruments can and have been modified in the past to indicate the product of two voltages including consideration of phase angle, i.e., to provide phase-sensitive voltage measurement.

Another form of phase-sensitive detector and indicator which can be made to operate at any selected frequency is a phase-angle voltmeter such as manufactured by North Atlantic Industries, Plainview, Long Island, New York, and identified as their Model VM-202. A further form of phase-sensitive detector and indicator which may be employed is a lock-in amplifier such as manufactured by Electronics, Missiles and Communications, Inc., Mount Vernon, New York, and identified as Model RJB. It is accordingly apparent that any combination of readily available components may be employed for providing the desired phase-sensitive detecting function and indicating function as indicated schematically by boxes 67 and 70 in FIG. 1 of the drawings.

It is apparent that the phase-sensitive detector means will assure that only those signals occurring in the measuring portion as a result of the oscillation of the actuating means will affect the indicator means to thereby prevent any signals not in phase with this frequency from causing a false reading.

In the arrangement shown in FIG. 1, the pressure connections from the oscillating Venturi measuring portion to a capacitance type differential pressure gauge are such that one pressure lead measures the ambient pressure while the other pressure lead measures the steady pressure plus signal pressure in the throat of the Venturi. In this manner, the sensitive elements of the differential pressure gauge may be subjected to relatively small differential pressures which will give rise to a small steady displacement of the differential sensor.

If the steady differential pressure in an arrangement shown in FIG. 1 should prove excessive, a modification as shown in FIG. 2 may be employed wherein similar parts have been given the same reference numerals primed in FIG. 1.

The only difference in the construction shown in FIG. 2 as compared to that shown in FIG. 1 is that a single pressure tap 55' is employed, pressure tap 60 as shown in FIG. 1 having been eliminated. The flexible tubing 75 leading from pressure tap 55' joins with a branch tube 76 which leads to the opposite side of the diaphragm of the gauge 57' as does tube 75. A damping mechanism such as a porous plug 77 is disposed within tube 76 to block the pressure alternations on one side of the differential pressure transducer while permitting the pressure oscillations to act on the second side of the differential pressure transducer through tube 75.

It is contemplated that sufficient accuracy may be obtained with the apparatus in certain instances where the output of the pressure measuring means is amplified and then simply passed through a filter tuned to the fundamental frequency of the actuating means. Where it is necessary on the other hand to detect a relatively small signal from a large noise background, it is anticipated that it will be necessary to also employ the phase-sensitive detector means or auto-correlated detection techniques.

Referring now to FIG. 3 of the drawings, a further modified form of the invention is illustrated wherein the fluid conduit means or flow pipe sections 80 and 80' are spaced from one another and support a pair of guide rods 82 and 83. A Venturi arrangement is again employed wherein the central portion 85 having the Venturi throat 86 therewithin is fixed in the position shown in FIG. 3. On the other hand, portions 87 and 88 of the Venturi configuration are freely axially reciprocable and are guided by the guide rods 82 and 83 in such reciprocatory movement, the guide rods extending through suitable openings provided in members 87 and 88.

Suitable means such as a bellows 90 is connected between members 80 and 87 to provide a fluid-tight seal. Bellows 91 and 92 provide a fluid-tight seal between the fixed portion 85 and the reciprocable portions 87 and 88 respectively. A further bellows means 93 is connected between members 88 and 80' in order to assure a fluid-tight seal at all times while permitting free axial oscillation of portions 87 and 88.

Actuating means 96 includes a pair of oppositely extending arms 97 and 98, arm 97 being connected through member 100 and 101 with the oscillating portion 87, and arm 98 of the actuating means being connected through members 102 and 103 with the portion 88. The actuating means includes an enlarged central portion 105 having a slot 106 formed therethrough which engages an eccentric 107 connected with the motor 108 in the same manner previously described so as to provide sinusoidal oscillation of the actuating means upon constant speed rotation of the motor 108.

A permanent magnet 110 is supported in arm 98 of the actuating means, and a coil 111 is disposed therearound for providing a reference voltage in this modification. A pressure transducer indicated generally by reference numeral 115 is mounted in the fixed portion 85 and is in communication with the interior of the Venturi throat 86. This pressure transducer in contrast to the transducers previously described is not of the differential type. It should be understood that any suitable type of pressure measuring means may be employed according to the present invention and with any of the various modifications disclosed herein. This pressure transducer may be of any conventional construction and may for example be of the type manufactured by Sensonics, Inc., Washington, D.C. and identified as their Model V-25. The pressure transducer is connected through connection 116 with a lock-in amplifier and detector means 118. Means 118 may be of the type manufactured by Electronics, Missiles and Communications, Inc., Mount Vernon, New York, and identified as their Model RJB.

Means 118 receives a reference signal through leads 119 and 120 which are connected with the coil 111 previously described.

Referring now to FIG. 4 of the drawings, the fluid conduit means or flow pipe is indicated by reference numeral 125, and has a pair of spaced openings 128 and 129 formed through the side wall thereof. Openings 128 and 129 communicate with the interior of the chamber defined by the housing 131.

An elongated rod 135 extends through the chamber defined by housing 131 and has an enlarged piston member 136 formed in the intermediate portion thereof, this piston member serving to separate the cavity within housing 131 into two separate chambers indicated by reference numerals 137 and 137', these two chambers being respectively in communication with the openings 128 and 129 through the side wall of the fluid conduit means.

A flexible sealing member 138 is fixed to the outer end of member 135, and a flexible sealing means 139 is connected with an intermediate portion of member 135 to ensure an effective seal between member 135 and the housing 131 as member 135 and its associated piston 136 reciprocate within housing 131.

Outer end 140 of member 135 is connected with any suitable driving mechanism so as to provide the piston 136 with a simple harmonic motion to thereby cause a flow variation to take place in the sensing area illustrated in FIG. 4. It should be noted in connection with the modification shown in FIG. 4 that the flow impedance of the fluid conduit means to the right and left of the portion shown in FIG. 4 is relatively high while the flow impedance through the flowmeter portion between the two ports 128, 129 is very low since the passage through the flowmeter is very short and virtually unobstructed. Accordingly, essentially all of the generated flow velocity oscillation produced by piston 136 will appear in the measuring portion of the apparatus.

The pressure tap 145 is ilustrated as being threaded into the side wall of the fluid conduit means 125 at a point substantially midway between the openings 128 and 129. The pressure tap 145 is connected by a flexible tube 146 with a pressure gauge transducer 147 which is adapted to provide an electrical signal output which is in turn fed to the amplifier 150. The output signal of the amplifier 150 passes through a filter 151 which is tuned to the fundamental frequency of oscillation of member 135 of the actuating means of the apparatus, the output of the filter 151 being fed into a suitable indicator 152 such as a voltmeter or the like.

In the modification shown in FIG. 4, the phase-sensitive detector means illustrated in the other modifications has been eliminated to illustrate an arrangement wherein it may not be necessary to provide the sophisticated detecting system provided in the other modifications.

Referring now to FIGS. 5 and 6 of the drawings, a modified form of pressure sensing means is illustrated, this modified form of pressure sensing means being incorporated in an intermediate measuring portion 160 of a fluid conduit means, this intermediate portion comprising a Venturi which is connected by means of flexible bellows to the adjacent portions of the fluid conduit means in a manner similar to that described in connection with FIGS. 1 and 2 of the drawings.

Mounted in the central throat portion of the measuring Venturi portion 160 is a substantially rigid moldable body 162 formed of plastic or the like within which is disposed a cylindrical body 163 formed of a piezoelectric ceramic material such as barium titanate, the inner and outer cylindrical surfaces of member 163 being coated with a suitable electrically conductive material such as a thin layer of silver or the like.

A thin tubular or cylindrical diaphragm member 165 which may be formed of thin steel or the like is disposed inwardly of and in contact with the inner surface of member 163, tubular member 165 being of a sufficient thinness to readily transmit pressure variations in the fluid flowing through the device to the body member 163 to generate electrical currents on the iner surface thereof.

A first electrical lead 167 is connected with the inner surface of the body 163 while a second electrical lead 168 is electrically connected with the outer surface thereof such that an output electrical signal is provided from the outer surface of the body 163 which is proportional to the pressure developed on body 163 through tubular member 165, this electrical signal being fed to an amplifier 170. The output of amplifier 170 is connected through a filter 171 with a suitable indicator means 172.

It is clear that the modification illustrated in FIGS. 5 and 6 will operate in the same manner as the aforementioned modifications, the pressure sensing means as illustrated in FIGS. 5 and 6 providing the advantage of measuring an average pressure over the entire inner surface of the Venturi throat rather than at a particular small area only. The virtue of this arrangement wherein the pressure is measured over a wide area is that it is not sensitive to very localized pressure disturbances such as those due to fluid turbulence, and thus this arrangement tends to minimize random pressure noises which might occur with the pressure gauges previously described.

It should be clearly understood that the various modifications of the present invention may be employed for measuring density as well as mass flow of the moving fluid, and either of these mass transport properties of the moving fluid can be readily determined and indicated by a simple change in the filter means of the system. In other words, the filter means may be tuned so as to pass the fundamental frequency of the superimposed oscillation in order to determine mass flow, or the filter means may be tuned to the second harmonic of the superimposed oscillation so as to determine the density of the fluid. It is also obvious that both of these mass transport properties can be determined and indicated simultaneously if desired by providing from the output of the amplifier for example in the circuits illustrated a parallel path through a pair of filters to a pair of indicators as will be well understood by one skilled in the art.

A further possible modification of the present invention is the employment of a plurality of the mass flow measuring devices arranged either in a series or parrallel arrangement with one another, such interconnection of the devices affording certain advantages as will hereinafter appear.

Considering now the theoretical concept underlying the series or parallel operation, if two measuring devices according to the present invention are placed in series and mechanically operated such that the means for superimposing the sinusoidal axial flow oscillations on the fluid are operated with a 180° phase difference, the analysis previously presented herein can be carried through.

Eq. 2 applies for the first measuring device, while the equation for the second measuring device will read $$U_2 = U + u \cos \omega t \qquad (15)$$

and therefore Eq. 3b becomes $$P_2 = p_0 - p_1 \cos \omega t + p_2 \cos 2\omega t \qquad (16)$$

If now we take the pressure difference, $\Delta P$, from our two pressure sensors, we obtain [subtracting Eq. 16 from Eq. 3b]

$$\Delta P = P_1 - P_2 = 2p_1 \cos \omega t \qquad (17)$$

where $p_1$ is still described by Eq. 4b or equivalently Eq. 6. In order to obtain the difference between $P_1$ and $P_2$ in Eq. 17, each of the measuring devices whether employed in series or parallel is provided with a pressure sensing means. In one form of pressure sensing means, such as shown in FIG. 1, the pressure sensing devices may be connected with a differential pressure gauge which is connected with an electrical system such as shown in FIG. 1. In another possible modification, the measuring devices may be each provided with a pressure sensor such as shown in FIG. 3 of the drawings wherein the two signals are fed into a differential input amplifier of conventional well-known construction.

The advantages of the series or parallel arrangement as discussed above is that any pressure fluctations arising from various causes in the exterior fluid system are cancelled out. Additionally, it should be noted that with a single flow measuring device one must expect (with any non-ideal fluid) that some measure of the device's flow oscillation will be propagated into the exterior fluid system. In most applications, this disturbance to the external fluid system is negligible. In the series analysis presented above, any such disturbance regardless of how small from one of the measuring devices is equal and opposite to the disturbance generated in the other, and accordingly, these disturbances to the external fluid system are entirely cancelled.

It is apparent that similar reasoning with corresponding advantages and benefits can be applied to the utilization of two measuring devices according to the present invention which are operated in parallel, provided the steady flow which is being measured is divided properly between the two devices.

Referring now to FIG. 7, first and second mass flow measuring devices similar to that shown in FIG. 1 are indicated generally by reference numerals 180 and 181, these devices being obviously connected in series in the associated fluid conduit means. Devices 180 and 181 are respectively provided with pressure transducers 182 and 183 similar to the transducer 115 previously described.

Transducers 182 and 183 are connected by connections 182′ and 183′ respectively with a differential amplifier 185, the output of which is connected through a filter 186 with a suitable indicator means 187.

The actuating means indicated generally by reference numerals 190 and 191 for producing oscillations of the Venturis in a manner similar to that previously described are so interrelated that the motion of the actuating means is 180° out of phase with one another, the eccentric portions of the actuating means being adapted to rotate in opposite directions as indicated by the arrows in FIG. 7 to thereby cause the Venturi measuring portion to simultaneously move toward one another and away from one another as will be clearly understood.

Referring now to FIG. 8 of the drawings, a further modification is illustrated wherein the measuring devices are connected in parallel with one another. A pair of devices according to the persent invention for measuring mass flow are illustrated generally by reference numerals 200 and 201, these devices being of the same general construction as previously described and incorporating pressure transducers 202 and 203 respectively which are also similar to the transducer 115 previously described.

Transducers 202 and 203 are connected respectively through connections 204 and 205 with a differential amplifier 208, the ouput of which is connected through a filter 209 to a suitable indicator means 210.

The actuating means for the two oscillating Venturis are indicated by reference numerals 212 and 214, these actuating means being similar to that previously described and being mounted and operated in such a manner that the eccentrics thereof are adapted to rotate in opposite directions as indicated by the arrows in FIG. 8 so as to be 180° out of phase as previously described in order to cancel out pressure fluctuations as previously described.

It is apparent that any one of the various arrangements shown in FIGS. 1 through 4 may be employed either in a series or parallel arrangement as shown in FIGS. 7 and 8, and various forms of means for superimposing the axial flow oscillation on the fluid may be employed as well as various forms of circuitry as disclosed herein. It is also apparent that the parallel flow arrangement could be modified in a number of ways such as providing an arrangement wherein one of the measuring devices is built coaxially within and spaced from a surrounding contra-oscillating measuring device.

It is apparent from the foregoing that there is provided new and novel apparatus for measuring mass flow, this apparatus having excellent linearity over a very wide dynamic range. The structural arrangements according to the present invention afford a minimum pressure drop through the flow meter and as is apparent provide a substantially obstructionless configuration.

The devices of the present invention also have a quite rapid response time. It is apparent that the various structural arrangements of the present invention are quite simple, inexpensive and compact in construction, and at the same time are quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Apparatus for measuring a mass transport property of a moving fluid comprising fluid conduit means having an axially extending measuring zone, means connected with said fluid conduit means for imposing independent, known, periodic flow changes in the fluid flowing through the measuring zone, sensing means operatively connected with said measuring zone for sensing pressure variations of the fluid within the measuring zone and for producing an output proportional to said pressure variations, discriminating means connected with the output of said sensing means for discriminating said output to reject undesired portions of the output and to pass only those portions of the output which are indicative of the pressure variations occurring in said measuring zone due to said known periodic flow changes in the fluid, and indicator means operatively connected with said discriminating means for indicating a mass transport property of the moving fluid in accordance with changes in the passed portion of the output.

2. Apparatus for measuring a mass transport property of a moving fluid comprising, fluid conduit means, having an axially extending measuring zone, movable mechanical means for superimposing independent, known, sinusoidal axial flow oscillations on the fluid passing through the measuring zone, pressure sensing means operatively connected with the interior of said measuring zone for measuring changes in pressure of the fluid as a result of said movable means, said pressure sensing means developing an electrical signal proportional to the measured pressure changes, detector means connected with the output of said pressure sensing means for detecting substantially only those electrical signals produced as a result of the oscillations generated by said movable means, and indicating means connected with said detector means for indicating the mass transport property of the moving fluid as a function of the pressure changes measured within said fluid conduit means.

3. Apparatus as defined in claim 2, wherein said detector means includes a filter means, said movable means operating at a predetermined frequency, said filter means being tuned so as to pass substantially only those signals produced as a result of the oscillations at said predetermined frequency.

4. Apparatus as defined in claim 2, wherein said detector means includes phase-sensitive detector means, and means associated with said movable means for generating a reference signal, said reference signal being impressed on said phase-sensitive detector means such that the phase-sensitive detector means passes only those signals from the pressure sensing means which are in phase with the movements of said movable means.

5. Apparatus for measuring a mass transport property of a moving fluid comprising fluid conduit means including a measuring portion, said measuring portion including an internal configuration through which the fluid flows substantially of the configuration of a Venturi tube, means for producing axial oscillations of at least a portion of said measuring portion of the fluid conduit means, pressure gauge means operatively connected with the Venturi throat portion of the measuring portion and adapted to produce an output signal proportional to changes of pressure of the fluid passing through said fluid conduit means, detector means operatively connected with said pressure gauge means and tuned substantially to the fundamental frequency of said means for producing oscillations of the measuring portion so as to pass signals from said pressure gauge which represent signals arising from the oscillations produced by said measuring portion oscillation, phase-sensitive detector means operatively connected with said pressure gauge means for passing only those signals which are substantially in phase with the oscillatory movements of said measuring portion of the fluid conduit means, and indicating means operatively connected with said detector means and said phase-sensitive detector means for indicating the mass transport property of the moving fluid in accordance with variations of pressure of the fluid within the fluid conduit means as measured by said pressure gauge means.

6. Apparatus as defined in claim 5, wherein the measuring portion of the fluid conduit means is so constructed and arranged that the Venturi throat portion thereof is oscillated in an axial direction relative to said fluid conduit means.

7. Apparatus as defined in claim 5, wherein said measuring portion is so constructed and arranged that the Venturi throat portion thereof is fixed.

8. Apparatus as defined in claim 5, wherein said means for producing oscillations of said measuring portion includes an oscillating member, a coil disposed adjacent said oscillating member, magnetic means associated with said oscillating member for producing an electric current in said coil upon oscillation of the oscillating member to thereby provide a reference signal, said coil being operatively connected with said phase-sensitive detector means.

9. Apparatus for measuring a mass transport property of a moving fluid comprising fluid conduit means having an axially extending measuring zone through which fluid is adapted to flow, movable mechanical means for superimposing independent, known, sinusoidal axial flow oscillations on the fluid passing through the measuring zone and comprising a pair of spaced openings formed in said fluid conduit means, said spaced openings being in communication with a closed chamber, and means within said closed chamber for alternately increasing the volume of the chamber in communication with one of said openings while simultaneously decreasing the volume of the chamber in communication with the other of said openings, pressure sensing means operatively connected with said measuring zone for sensing pressure variations of the fluid within the measuring zone and for producing an output electrical signal proportional to said pressure variations, discriminating means connected with the output of said sensing means for discriminating said output to reject undesired portions of the output and to pass only those portions of the output which are indicative of the pressure variations occurring in said measuring zone due to said known periodic flow changes in the fluid, and indicator means operatively connected with said discriminating means for indicating a mass transport property of the moving fluid in accordance with changes in the passed portion of the output.

10. Apparatus as defined in claim 9, wherein said means for increasing and decreasing the volume of the chamber in communication with the respective openings comprises a reciprocable member dividing the chamber into two separate cavities, and means for producing a simple harmonic motion of said reciprocable member.

11. Apparatus for measuring a mass transport property of a moving fluid comprising fluid conduit means through which fluid to be measured flows at a substantially steady flow, said fluid conduit means including an axially extending measuring portion, movable mechanical means operatively connected with said measuring portion for superimposing independent, known, sinusoidal axial flow oscillations on the fluid passing through the measuring portion, pressure sensing means operatively connected with the measuring portion of said fluid conduit means for measuring changes of pressure of the fluid within said measuring portion, said pressure sensing means including a relatively thin tubular member through which fluid is adapted to flow, an annular body of material surrounding said tubular member and having the inner surface thereof in contact with the outer surface of said tubular member, said body being formed of a material exhibiting piezoelectric characteristics whereby an electrical signal is developed proportional to the measured pressure changes, detector means connected with the output of said pressure sensing means for detecting substantially only those electrical signals produced as a result of the oscillations generated by said movable means, and indicating means connected with said detector means for indicating the mass transport property of the moving fluid as a function of the pressure changes measured within said fluid conduit means.

12. Apparatus for measuring mass flow of a fluid comprising fluid conduit means through which fluid to be measured flows at a substantially steady flow, a plurality of measuring devices interconnected with said fluid conduit means, each of said devices including an axially extending measuring portion through which fluid is adapted to flow, movable mechanical means operatively connected with each of said devices for superimposing independent, known, sinusoidal axial flow oscillations on the fluid passing through the associated measuring portion, the flow oscillations of one of said devices being substantially 180° out of phase with the flow oscillations of the other of said devices, pressure sensing means operatively connected with the measuring portion of each of said devices for measuring change of pressure of the fluid within the said measuring portions as a result of said movable means, said pressure sensing means developing an electrical signal proportional to the measured pressure changes, detector means connected with the output of said pressure sensing means for detecting substantially only those electrical signals produced as a result of the oscillations generated by said movable means, and indicating means connected with said detector means for indicating the mass transport property of the moving fluid as a function of the pressure changes measured within said fluid conduit means.

13. Apparatus as defined in claim 12, wherein said devices are connected in series with one another.

14. Apparatus as defined in claim 12, wherein said devices are connected in parallel with one another.

References Cited by the Examiner

UNITED STATES PATENTS

| | | | |
|---|---|---|---|
| 2,741,918 | 4/1956 | Boisblanc | 73—194 |
| 3,102,423 | 9/1963 | Prindle | 73—194 |
| 3,138,955 | 6/1964 | Uttley | 73—228 |

FOREIGN PATENTS 710,593  9/1941  Germany.

RICHARD C. QUEISSER, *Primary Examiner.*

DAVID SCHONBERG, *Examiner.*